US006947600B1

(12) United States Patent
Sato et al.

(10) Patent No.: US 6,947,600 B1
(45) Date of Patent: Sep. 20, 2005

(54) INFORMATION PROCESSING METHOD, APPARATUS AND STORAGE MEDIUM FOR RECEIVING AND DECODING A CODE SEQUENCE OBTAINED BY ENCODING AN IMAGE

(75) Inventors: Makoto Sato, Tokyo (JP); Hiroshi Kajiwara, Tokyo (JP); Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 09/702,764

(22) Filed: Nov. 1, 2000

(30) Foreign Application Priority Data

Nov. 5, 1999 (JP) .................................. 11-315536

(51) Int. Cl.[7] .............................................. G06K 9/36
(52) U.S. Cl. ..................................... 382/233; 382/251
(58) Field of Search ......... 382/232–253; 375/246–247

(56) References Cited

U.S. PATENT DOCUMENTS

| 5,402,248 | A | | 3/1995 | Sato et al. | |
| 5,812,146 | A | | 9/1998 | Sato et al. | |
| 5,812,788 | A | * | 9/1998 | Agarwal | 375/240.3 |
| 5,845,243 | A | * | 12/1998 | Smart et al. | 704/230 |
| 5,861,892 | A | | 1/1999 | Sato et al. | |
| 5,923,787 | A | * | 7/1999 | Hara et al. | 382/251 |
| 5,945,930 | A | | 8/1999 | Kajiwara | |
| 6,028,963 | A | | 2/2000 | Kajiwara | |
| 6,031,938 | A | | 2/2000 | Kajiwara | |
| 6,101,282 | A | | 8/2000 | Hirabayashi | |
| 6,373,894 | B1 | * | 4/2002 | Florencio et al. | 375/240.19 |
| 6,389,074 | B1 | * | 5/2002 | Andrew | 375/240.5 |
| 6,459,816 | B2 | * | 10/2002 | Matsuura et al. | 382/248 |
| 6,603,884 | B2 | * | 8/2003 | Matsuura et al. | 382/248 |

FOREIGN PATENT DOCUMENTS

JP  11-266161 A  *  9/1999  ........... H03M 7/30

OTHER PUBLICATIONS

U.S. Appl. No. 09/050,120, filed Mar. 30, 1998.
U.S. Appl. No. 09/370,198, filed Aug. 9, 1999.
U.S. Appl. No. 09/627,722, filed Jul. 28, 2000.
U.S. Appl. No. 09/412,432, filed Oct. 5, 1999.
U.S. Appl. No. 09/413,022, filed Oct. 6, 1999.

* cited by examiner

*Primary Examiner*—Jingge Wu
(74) *Attorney, Agent, or Firm*—Fitzpatrick, Cella, Harper & Scinto

(57) ABSTRACT

An entropy decoder receives a code sequence which is obtained by breaking up coefficients that have undergone discrete wavelet transformation into bit planes, and encoding the bit planes, and entropy-decodes the code sequence. A correction value computing unit determines correction values used to correct dequantized values in a dequantizer in accordance with the number of quantization indices decoded by the entropy decoder. The dequantizer receives the quantization indices decoded by the entropy decoder, and generates a series of coefficient sequences that represent an image by correcting and dequantizing the quantization indices on the basis of the values of the quantization indices and the correction values obtained by the correction value computing unit. A predetermined inverse discrete wavelet transformer restores an image by computing the inverse transforms of the coefficient sequences obtained by the dequantizer, and outputs the restored image to an image output unit.

29 Claims, 11 Drawing Sheets

FIG. 2A
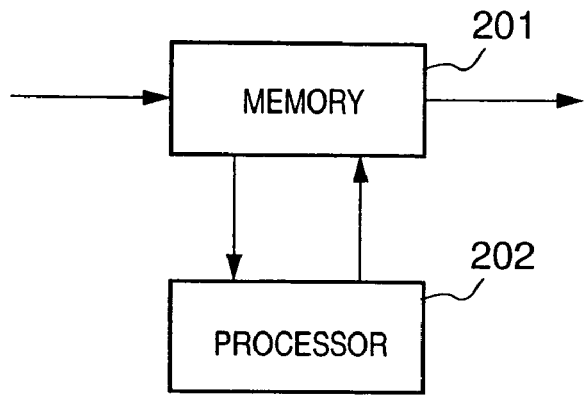
FIG. 2B
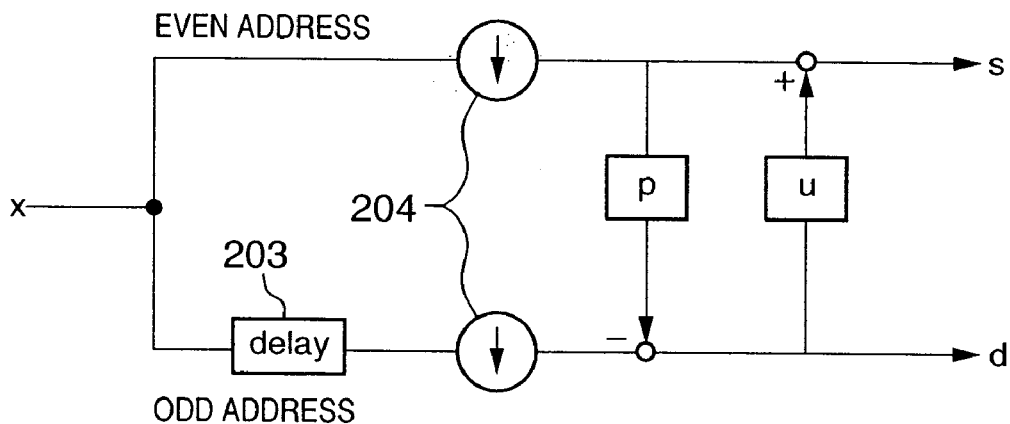
FIG. 2C
| LL | HL2 | HL1 |
| LH2 | HH2 | |
| LH1 | | HH1 |

FIG. 4A

| MH | TH0 | BS0 | TH1 | BS1 | ... | THn-1 | BSn-1 |

FIG. 4B

| IMAGE SIZE | TILE SIZE | NUMBER OF COMPONENTS | COMPONENT INFORMATION |

FIG. 4C

| TILE LENGTH | ENCODING PARAMETER |

FIG. 4D

| HL2 | LH2 | HL2 | LL | LL | ... | LL | HL2 | LH2 | HH2 | LH1 | HL1 | HH1 |

BIT PLANE S-1 | BIT PLANE S-2 | BIT PLANE 0

INFORMATION PROCESSING METHOD, APPARATUS AND STORAGE MEDIUM FOR RECEIVING AND DECODING A CODE SEQUENCE OBTAINED BY ENCODING AN IMAGE

FIELD OF THE INVENTION

The present invention relates to an image processing method and apparatus for receiving and decoding a code sequence obtained by encoding image data, and a storage medium.

BACKGROUND OF THE INVENTION

Along with remarkable advances of computers and networks in recent years, many kinds of information such as text data, image data, audio data, and the like are stored or transmitted in the networks. Among these data, an image, especially, a multi-valued image contains a very large volume of information, and upon storing and transmitting such image, the image data size becomes huge. For this reason, storage and transmission of an image use high-efficiency coding that reduces the data size by removing redundancy of an image or changing the contents of an image to a degree at which deterioration of image quality is not visually recognizable.

As an example of the high-efficiency coding, JPEG recommended by ISO and ITU-T as an international standard coding scheme of still image is prevalently used. JPEG specifies several coding schemes in correspondence with use purposes of encoded data of images to be encoded, and roughly has two modes, i.e., a DCT use mode that uses discrete cosine transformation and aims at irreversible coding, and a spatial mode that aims at reversible coding on the basis of two-dimensional DPCM.

A detailed description of these modes will be omitted since these modes are described in ITU-T Recommendation T.81 | ISO/IEC 10918-1 and the like. The DCT mode controls the bit rate by changing the quantization step in quantization, and must give a large quantization step to set a low target bit rate. As a result, especially under a low-bit rate condition, the reproduced image is distorted beyond an allowable level due to quantization.

Also, JPEG specifies hierarchical coding. In hierarchical coding, a plurality of images having different resolutions are generated by reducing an input image in a plurality of scales like ½, ¼, . . . in both the horizontal and vertical directions, and an image having the lowest resolution is encoded and transmitted like a normal image.

In this hierarchical coding, the DCT and spatial modes can be used. If hierarchical coding is implemented as reversible coding, since the spatial mode is used for all the scales or only the last scale, and the DCT mode is used for all other scales, an apparatus must comprise a circuit or program that can implement both the two modes, resulting in a complicated apparatus.

As a scheme that can combat these problems, a coding scheme using discrete wavelet transformation has been proposed. Such coding scheme using discrete wavelet transformation is advantageous since it assures higher compression performance than the DCT mode, can implement hierarchical coding in JPEG in a single system, and so forth.

On the other hand, requirements for image compression coding are becoming increasingly stricter, and even for a binary image such as a text image which is conventionally encoded by another scheme, a decoded image is required to have higher image quality. However, with the conventional scheme, both natural and binary images or an image including these images cannot be restored, while assuring sufficiently high image quality of the decoded image.

SUMMARY OF THE INVENTION

The present invention has been made in consideration of the above prior arts, and has as its object to provide an image processing method and apparatus that can decode a compression-encoded image while assuring high image quality, and a storage medium.

It is another object of the present invention to provide an image processing method and apparatus, which decode an image with high image quality on the basis of the characteristics of an image expressed by a compression-encoded code sequence.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 2A to 2C are views for explaining the arrangement and operation of a discrete wavelet transformer according to the first embodiment;

FIGS. 4A to 4D are views for explaining a code sequence generated by the image encoding apparatus according to the first embodiment of the present invention;

DETAILED DESCRIPTION OF THE EMBODIMENTS

Preferred embodiments of the present invention will be described in detail hereinafter with reference to the accompanying drawings.

First Embodiment

Figure 1A:
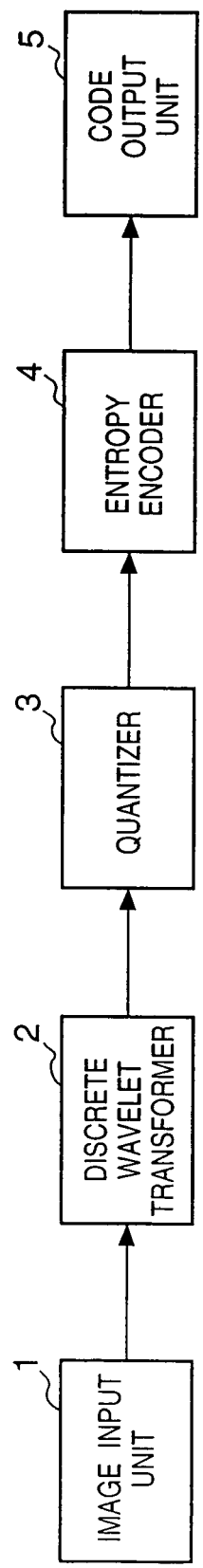
FIG. 1A is a block diagram showing the arrangement of an image encoding apparatus according to the first embodiment of the present invention.
Figure 1B:
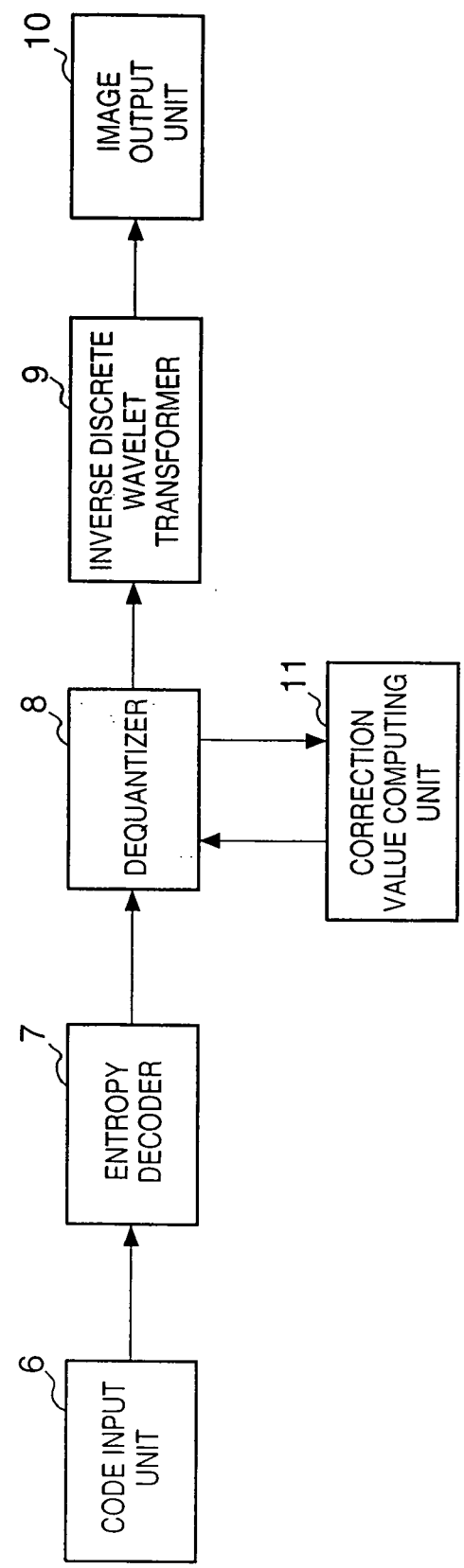
FIG. 1B is a block diagram showing the arrangement of a decoding apparatus according to the first embodiment of the present invention.

FIGS. 1A and 1B are block diagrams respectively showing the basic arrangements of image encoding and decoding apparatuses according to the first embodiment of the present invention.

FIG. 1A is a block diagram showing the arrangement of an image encoding apparatus. Referring to FIG. 1A, reference numeral 1 denotes an image input unit for inputting image data. The image input unit 1 comprises an image sensing device such as a scanner, digital camera, or the like for scanning a document image, an interface unit having an interface function, or the like. Reference numeral 2 denotes a discrete wavelet transformer for computing the two-dimensional discrete wavelet transform of the input image. Reference numeral 3 denotes a quantizer for quantizing coefficients obtained by discrete wavelet transformation. Reference numeral 4 denotes an entropy encoder for entropy-encoding the coefficients quantized by the quantizer 3. Reference numeral 5 denotes a code output unit for outputting codes encoded by the encoder 4.

Note that the apparatus according to the first embodiment is not limited to a dedicated apparatus shown in FIG. 1A, and the present invention can be applied to, e.g., a case wherein a versatile PC or workstation loads a program to implement the aforementioned functions.

The operations will be explained in turn below with reference to FIG. 1A. The image input unit 1 inputs pixel signals that form an image to be encoded in the raster scan order. The input image is input to the discrete wavelet transformer (DWT) 2. In the following description, an image signal input from the image input unit 1 is expressed by a monochrome multi-valued image. However, upon encoding a plurality of color components of a color image or the like, each of R, G, and B color components or luminance and chromaticity components can be compressed as the monochrome component.

The discrete wavelet transformer 2 executes a two-dimensional wavelet transformation process for the input image signal, and computes and outputs transform coefficients.

FIGS. 2A to 2C are views for explaining the discrete wavelet transformer 2 according to this embodiment.

FIG. 2A shows the basic arrangement of the discrete wavelet transformer 2. An image signal input from the image input unit 1 is stored in a memory 201, is sequentially read out by a processor 202 to undergo the discrete wavelet transformation process, and is stored in the memory 201 again.

FIG. 2B is a diagram for explaining the arrangement of the process in the processor 202.

Referring to FIG. 2B, the input image signal is separated into odd and even address signals by a combination of a delay element 203 and down samplers 204, and these signals undergo filter processes of two filters p and u. In FIG. 2B, s and d represent low- and high-pass coefficients upon breaking up a one dimensional image signal to one level, and are respectively computed by:

$$d(n)=x(2n+1)-\text{floor}((x(2n)+x(2n+2))/2) \quad (1)$$

$$s(n)=x(2n)+\text{floor}((d(n-1)+d(n))/4) \quad (2)$$

where x(n) is an image signal to be transformed, and floor(x) is a function of outputting a maximum integer smaller than x.

In this manner, the one dimensional discrete wavelet transformation process is done for an image signal. Since two-dimensional discrete wavelet transformation is implemented by sequentially executing one dimensional transformation in the horizontal and vertical directions of an image and its details are known to those who are skilled in the art, a description thereof will be omitted.

FIG. 2C shows an example of the format of two levels of transformation coefficient groups obtained by the two-dimensional discrete wavelet transformation process. An image signal is broken up into coefficient sequences HH1, HL1, LH1, ..., LL in different frequency bands. Note that these coefficient sequences will be referred to as subbands hereinafter. The coefficients of the individual subbands are output to a quantizer 3.

The quantizer 3 quantizes the input coefficients by a predetermined quantization step, and outputs indices corresponding to the quantized values. In this case, quantization is described by:

$$q=\text{sign}(c)\ \text{floor}(abs(c)/\Delta) \quad (3)$$

$$\text{sign}(c)=1;\ c\geq 0 \quad (4)$$

$$\text{sign}(c)=-1;\ c<0 \quad (5)$$

where c is a coefficient to be quantized, and abs(c) is the absolute value of c.

The entropy encoder 4 segments the quantization indices input from the quantizer 3 into bit planes, executes binary arithmetic coding in units of bit planes, and outputs a code sequence.

Figure 3:
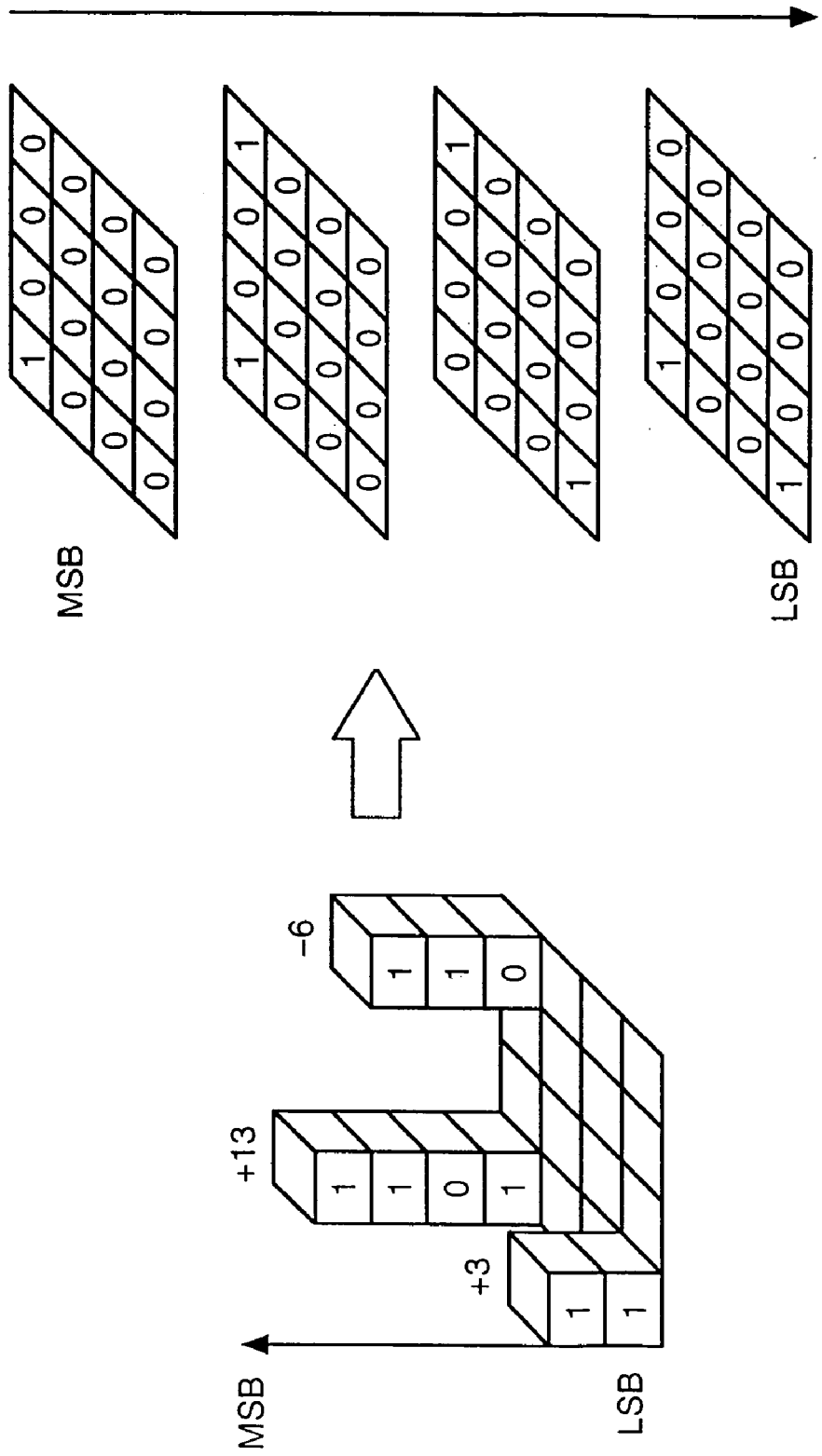
FIG. 3 is a view for explaining the operation of an entropy encoder according to the first embodiment.

FIG. 3 is a view for explaining the operation of the entropy encoder 4. In this example, a 4×4 subband region includes three nonzero indices, which respectively have values "+13", "−6", and "+3". The entropy encoder 4 scans this region to obtain a maximum value M, and computes the number S of bits required for expressing the maximum quantization index by:

$$S=\text{ceil}(\log_2(abs(M))) \quad (6)$$

where ceil(x) is the smallest one of integers equal to or larger than x.

In FIG. 3, since the maximum coefficient value is "13", the value of S is "4", and 16 quantization indices in the sequence are processed in units of four bit planes, as indicated by the right side in FIG. 3. The entropy encoder 4 makes binary arithmetic coding of bits of the most significant bit plane (indicated by MSB in FIG. 3) and outputs the coding result as a bitstream. Then, the encoder 4 lowers the bit plane by one level, and encodes and outputs bits of each bit plane until the bit plane of interest reaches the least significant bit plane (indicated by LSB in FIG. 3). At this time, a sign of each quantization index is entropy-encoded immediately after the first nonzero bit is detected upon scanning the bit plane.

FIGS. 4A to 4D show the format of a code sequence which is generated and output in this way.

FIG. 4A shows the overall format of a code sequence, in which MH is a main header; THi (i=0 to n−1), a tile header; and BSi (i=0 to n−1), a bitstream. The main header MH is comprised of the size (the numbers of pixels in the horizontal and vertical directions) of an image to be encoded, a tile size upon breaking up the image into tiles as a plurality of rectangular regions, the number of components indicating the number of color components, the size of each component, and component information indicating bit precision, as shown in FIG. 4B. In this embodiment, since an image is not broken up into tiles, the tile size is equal to the image size, and when the image to be encoded is a monochrome multi-valued image, the number of components is "1".

FIG. 4C shows the format of the tile header TH.

The tile header TH consists of a tile length including the bitstream length and header length of the tile of interest, and an encoding parameter for the tile of interest. The encoding parameter includes a discrete wavelet transform level, filter type, and the like.

FIG. 4D shows the format of a bitstream in this embodiment. The bitstream is formed in units of bit planes, which are set in the order from an upper bit plane to a lower bit plane. In the bit planes, the encoding results of the bit planes of a given quantization index in each subband are sequentially set in units of subbands. In FIG. 4D, S indicates the number of bits required for expressing the maximum quantization index. The code sequence generated in this manner is output to the code output unit 5.

A decoding apparatus according to the first embodiment of the present invention will be described below.

FIG. 1B is a block diagram showing the arrangement of an image decoding apparatus according to the first embodiment.

Referring to FIG. 1B, reference numeral 6 denotes a code input unit which receives a code sequence encoded by the encoding apparatus shown in, e.g., FIG. 1A. Reference numeral 7 denotes an entropy decoder which executes a decoding process opposite to the encoding process in the entropy encoder 4 in FIG. 1A. Reference numeral 8 denotes a dequantizer; 9, an inverse discrete wavelet transformer; 10, an image output unit; and 11, a correction value computing unit.

Figure 5:
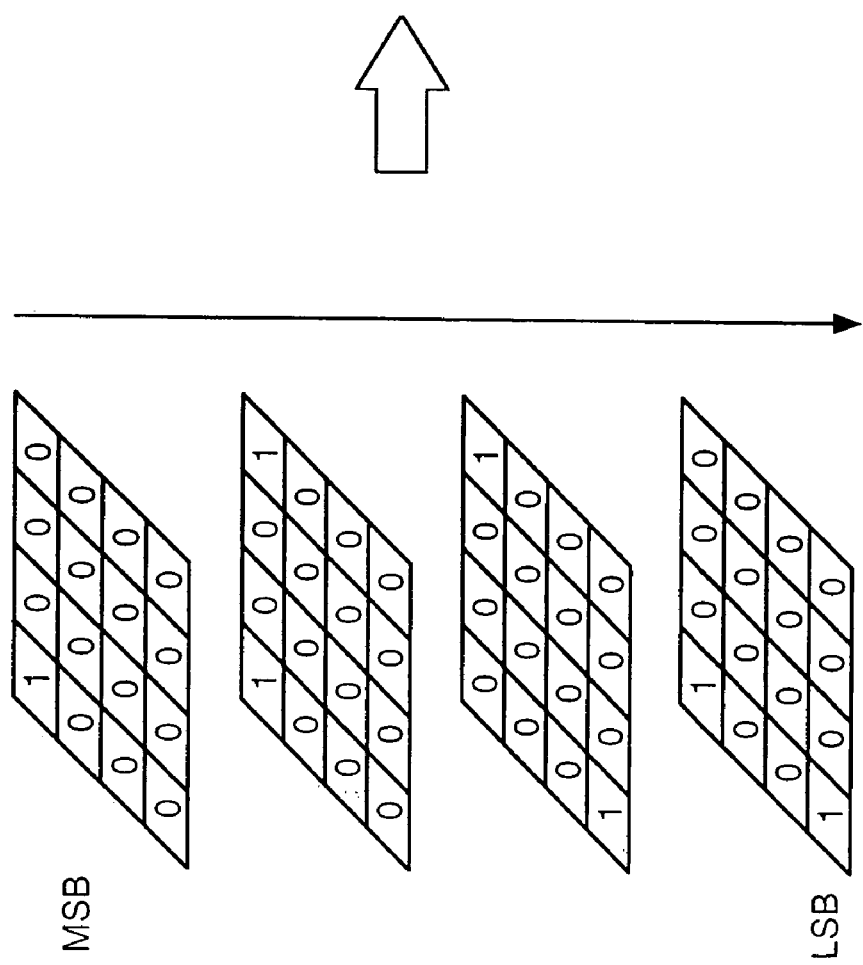
FIG. 5 is a view for explaining the operation of an entropy decoder according to the first embodiment.

In the aforementioned arrangement, the code input unit 6 receives a code sequence, analyzes the header included in that sequence to extract parameters required for the subsequent processes, and controls the flow of processes if necessary or outputs required parameters to the subsequent processing units. The bitstreams included in the input code sequence are output to the entropy decoder 7. The entropy decoder 7 decodes and outputs the bitstreams in units of bit planes. FIG. 5 shows the decoding sequence at that time.

FIG. 5 illustrates the flow for sequentially decoding one subband region to be decoded in units of bit planes to finally restore a quantization index, i.e., the process opposite to FIG. 3. In this case, bit planes are decoded from the MSB to the LSB in the order of an arrow of the bit planes on the left side of FIG. 5. The restored quantization indices are output to dequantizer 8 and the indices for a predetermined number of lines are temporarily stored in the internal buffer of the dequantizer 8. The correction value computing unit 11 computes a correction value upon dequantization in the dequantizer 8 on the basis of the distribution of the quantization indices buffered inside the dequantizer 8, and outputs that value to the dequantizer 8.

Figure 6:
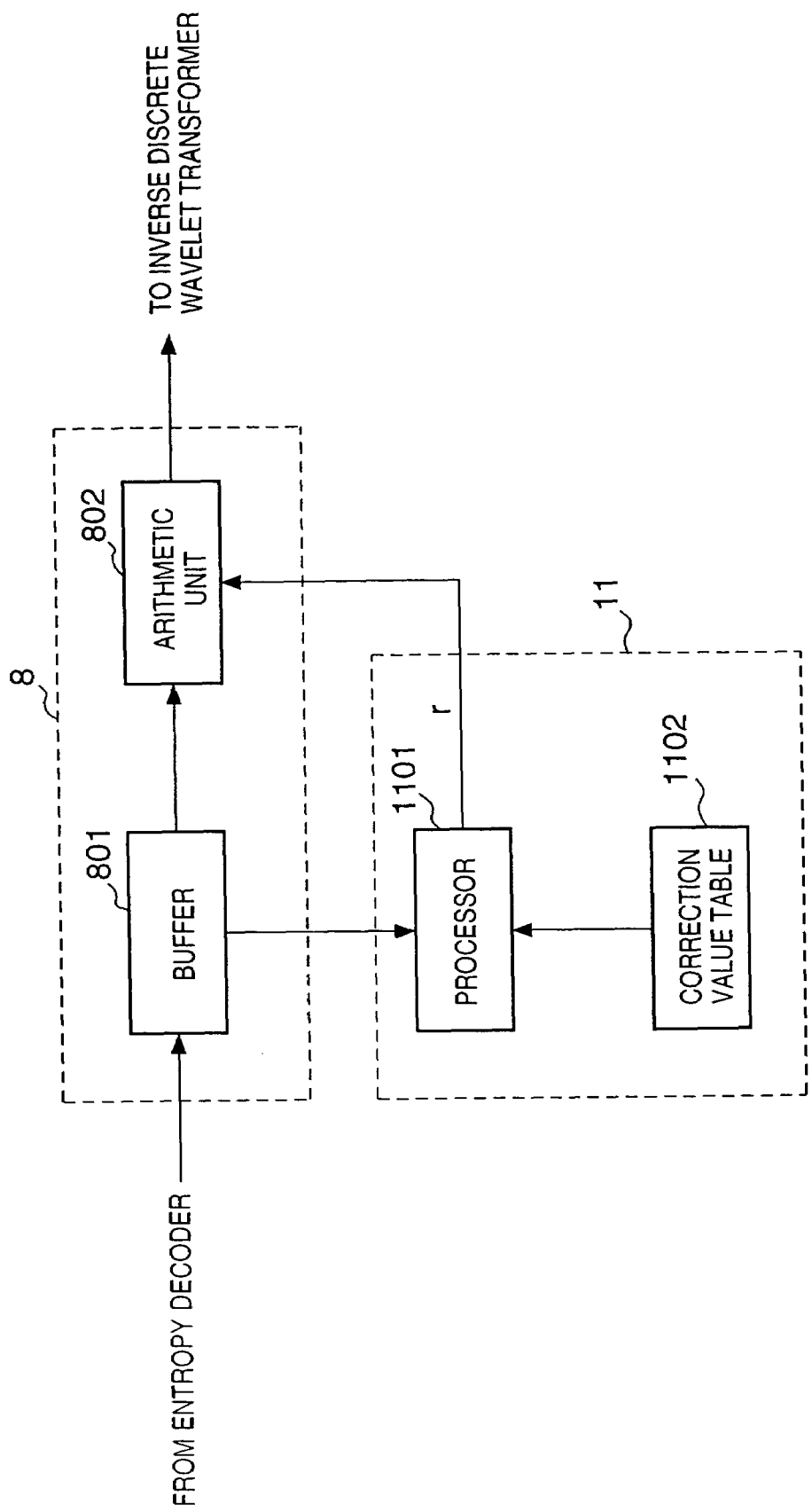
FIG. 6 is a block diagram showing the arrangement of a correction value computing unit of the decoding apparatus of the first embodiment.

FIG. 6 is a block diagram showing the arrangement of the dequantizer 8 and correction value computing unit 11 according to the first embodiment.

A processor 1101 selects "0.5" as a correction value r when a quantization index of interest buffered in a buffer 801 of the dequantizer 8 belongs to an LL subband of the discrete wavelet transformation, and outputs r (=0.5) to an arithmetic unit 802 of the dequantizer 8.

On the other hand, when the quantization index belongs to a subband other than LL, the processor 1101 reads out the buffered quantization indices from the buffer 801 of the dequantizer 8, and counts the number of "0" quantization indices included in the readout indices. The processor 1101 compares the count value of the "0" quantization indices with a predetermined threshold value T, reads out a correction value r set by a predetermined method in a correction value table 1102 on the basis of the comparison result, and outputs it to the arithmetic unit 802 in the dequantizer 8.

In the first embodiment, when the number of quantization indices is equal to or smaller than the threshold value T, it is determined that the region of interest is a natural image, and "0.5", is selected as the value r. On the other hand, when the number of quantization indices is larger than the threshold value T, it is determined that the region of interest is a text image, and r="0.875" is read out from the correction value table. The aforementioned operation is made in synchronism with dequantization in the dequantizer 8, and the correction values r are computed and output in units of quantization indices.

The arithmetic unit 802 of the dequantizer 8 sequentially reads out the quantization indices in the buffer 801, and restores discrete wavelet transform coefficients from their values and correction values r by:

$$c' = \Delta \times (q+r); q>0 \tag{7}$$

$$c' = \Delta \times (q-r); q<0 \tag{8}$$

$$c' = 0; q=0 \tag{9}$$

where q is a quantization index, and Δ is a quantization step which assumes the same value as that used in encoding. c' is a restored transform coefficient, which is obtained by restoring a coefficient s or d in encoding. This transform coefficient c' is output to the inverse discrete wavelet transformer 9.

Figure 7:
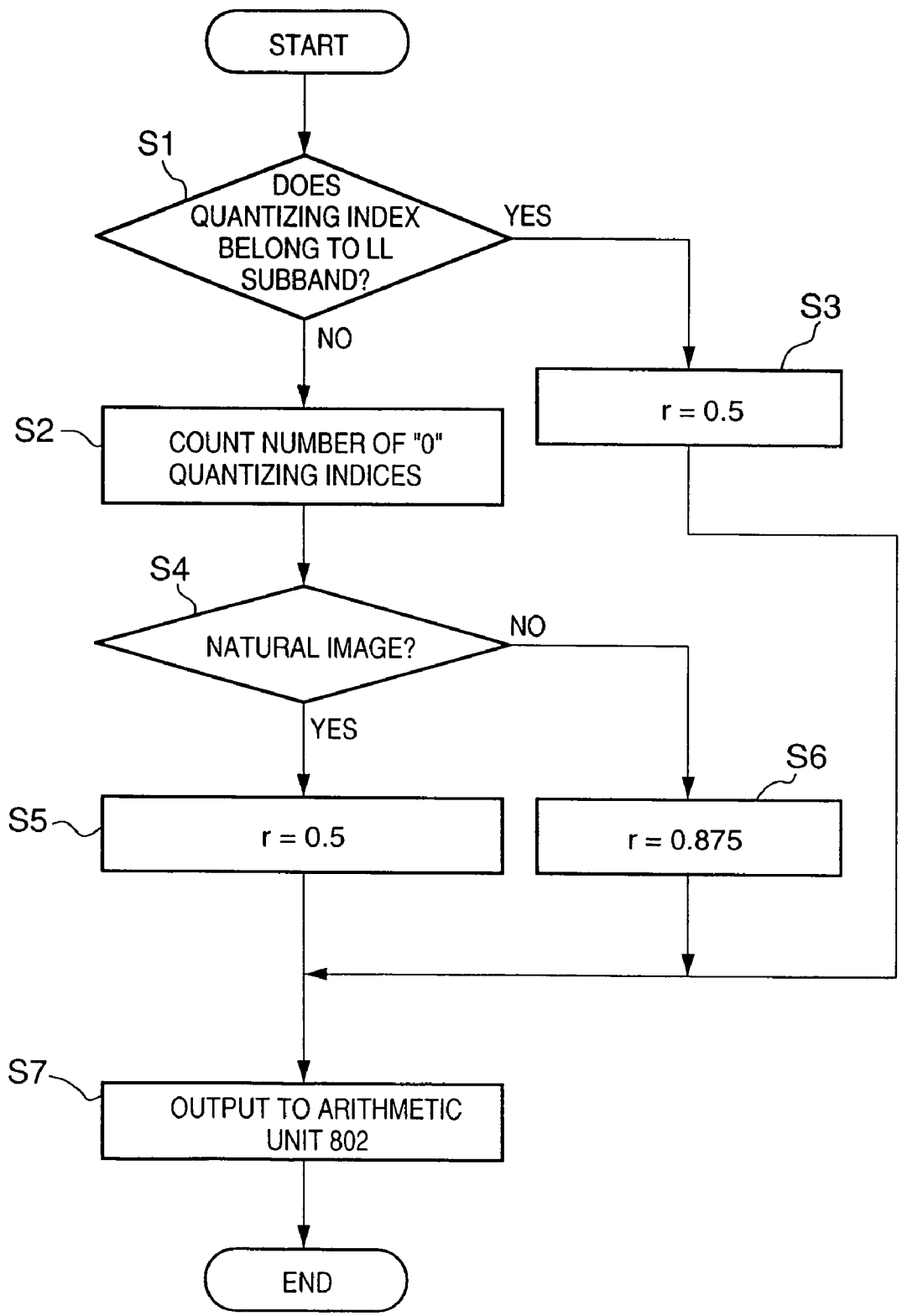
FIG. 7 is a flow chart showing the process in the correction value computing unit of the decoding apparatus of the first embodiment.

FIG. 7 is a flow chart showing the process in the processor 1101 of the correction value computing unit 11 mentioned above.

Referring to FIG. 7, a quantization index stored in the buffer 801 of the dequantizer 8 is read out, and it is checked if that quantization index belongs to an LL subband of discrete wavelet transformation (step S1). If YES in step S1, the flow advances to step S3, and "0.5" is selected as the correction value r and is output to the arithmetic unit 802 of the dequantizer 8.

On the other hand, if that quantization index belongs to a subband other than LL, the flow advances to step S2 to read out the buffered quantization indices from the buffer 801 of the dequantizer 8, and to count the number of "0" quantization indices included in the readout indices. The flow advances to step S4 to compare the count value of quantization indices with the predetermined threshold value T, and to check based on the comparison result if that image is a natural image. More specifically, if the count value of quantization indices is equal to or smaller than the threshold value T, it is determined that the image is a natural image, and the flow advances to step S5 to read out "10.5" from the correction value table 1102 as the value r. The readout value is then output to the arithmetic unit 802 (step S7).

On the other hand, if that count value is larger than the threshold value T, it is determined that the region of interest is a text image, and the flow advances from step S4 to step S6 to read out "0.875" as the value r. The readout value is then output to the arithmetic unit 802 (step S7).

Figure 8A:
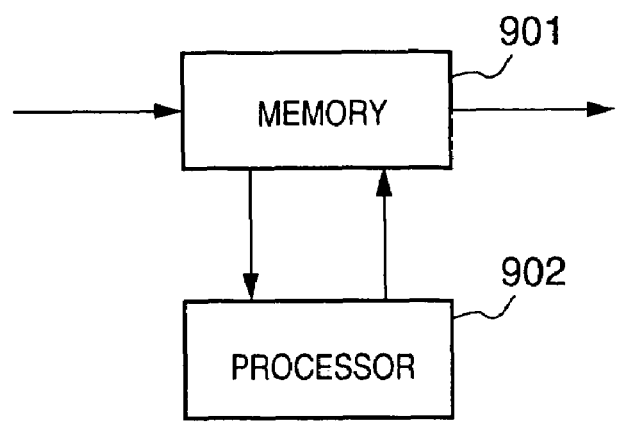
FIGS. 8A and 8B are block diagrams for explaining an inverse discrete wavelet transformer of the decoding apparatus of the first embodiment.
Figure 8B:
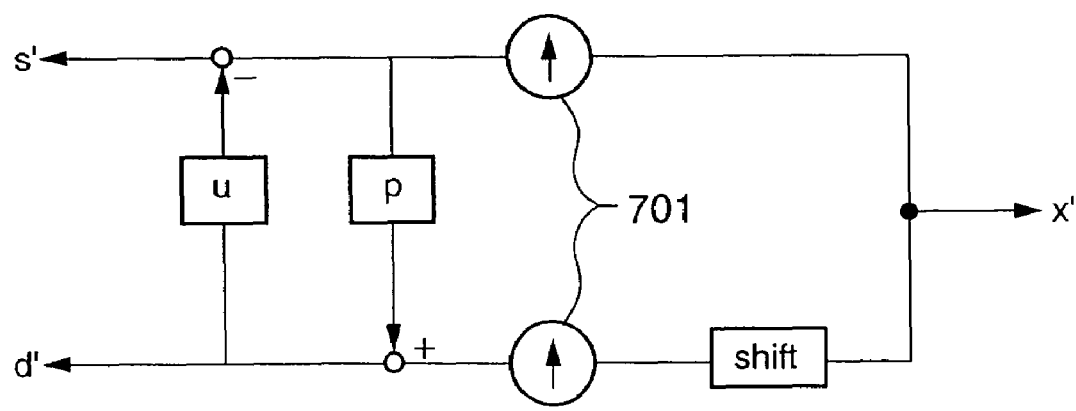

FIGS. 8A and 8B are block diagrams for explaining the arrangement and process of the inverse discrete wavelet transformer 9.

Referring to FIG. 8A, the transform coefficients input from the dequantizer 8 are stored in a memory 901. A processor 902 executes one dimensional inverse discrete wavelet transform process while sequentially reading out the transform coefficients from the memory 901, thus implementing a two-dimensional inverse discrete wavelet transform process. The two-dimensional inverse discrete wavelet transform is executed in a sequence opposite to the forward transform, but since its details are known to those who are skilled in the art, a description thereof will be omitted.

FIG. 8B is a diagram for explaining processing blocks of the processor 902. The input transform coefficients undergo two filter processes of filters u and p, and are added after being up-sampled by up samplers 701, thus outputting an image signal x'. These processes are described by:

$$x'(2n) = s'(n) - \text{floor}((d'(n-1) + d'(n))/4) \quad (10)$$

$$x'(2n+1) = d'(n) + \text{floor}((x'(2n) + x'(2n+2))/2) \quad (11)$$

With the aforementioned processes, the original image is reclaimed and is output to the image output unit 10.

Note that the image output unit 10 may be an image display device such as a monitor or the like, or may be a storage device such as a magnetic disk or the like.

As described above, according to the first embodiment, the correction value r is obtained in correspondence with the number of "0" quantization indices in surrounding regions including the quantization index to be dequantized upon dequantization, and when the number of "0"s is larger than the predetermined value, it is determined that the region of interest is a text image, and "0.875" is output to the arithmetic unit as the value r. On the other hand, when the number of "0"s is smaller than the predetermined value, it is determined that the region of interest is a natural image, and "0.5" is output as r to the arithmetic unit.

Note that the present invention is not limited to such specific dequantization, and the correction value may be selected in accordance with the values of quantization indices of surrounding regions except for the quantization index to be dequantized.

As a result, when the dequantizer 8 dequantizes using "0.5" as the correction value r, the coefficient value to be restored assumes an intermediate value between two coefficient values discretized by quantization. When the image of interest is a natural image, since the coefficient value to be restored assumes an intermediate value, quantization errors can be reduced on the average.

However, when the image of interest is a text image, and a source image signal is discretized to two values, the coefficient to be restored in a subband especially corresponding to high frequency is set to be larger than the intermediate value, thereby suppressing losses of high-frequency components in the image signal and improving image quality.

Furthermore, in the first embodiment, since "0.5" is consistently selected as the correction value r for an LL subband of discrete wavelet transform, luminance level errors of the entire restored image are minimized on the average.

Second Embodiment

In the first embodiment, after all the bit planes of a quantization index are decoded, dequantization is made to restore an image. Alternatively, the present invention can be applied to a case wherein an image is restored and displayed before decoding all the bit planes. The operation for restoring and displaying an image stepwise in a decoding apparatus according to the second embodiment of the present invention will be explained below.

An image display pattern upon restoring an image stepwise will be explained below with reference to FIGS. 9A and 9B.

Figure 9A:
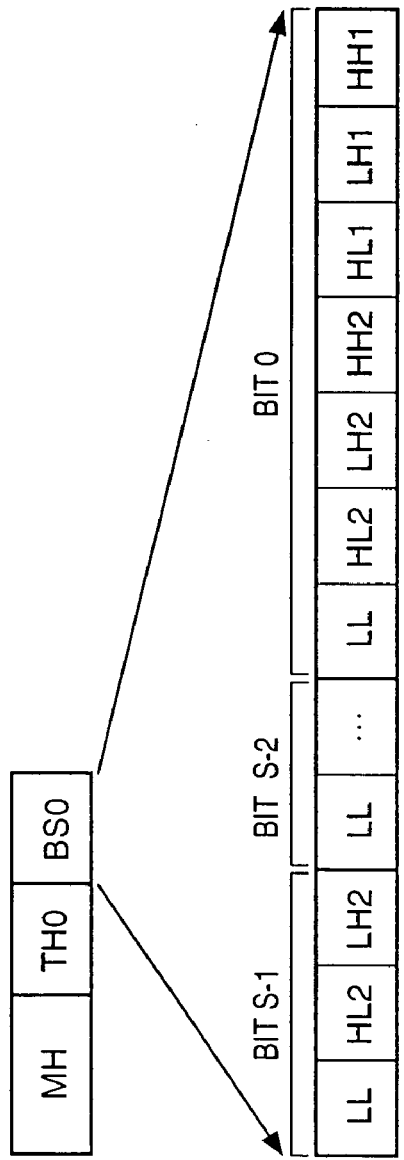
FIGS. 9A and 9B are views for explaining a code sequence and restored image examples in the first embodiment of the present invention.

FIG. 9A shows an example of a code sequence, the basic format of which is based on FIGS. 4A to 4D, but the entire image is set as a tile in this case. Hence, the code sequence includes only one tile header (TH0) and bitstream (BS0). In this bitstream (BS0), codes are set from the most significant bit plane (Bit S-1) to the least significant bit plane (Bit 0).

The decoding apparatus according to the second embodiment sequentially reads this bitstream, and displays an image upon completion of decoding of codes of each bit plane.

Figure 9B:
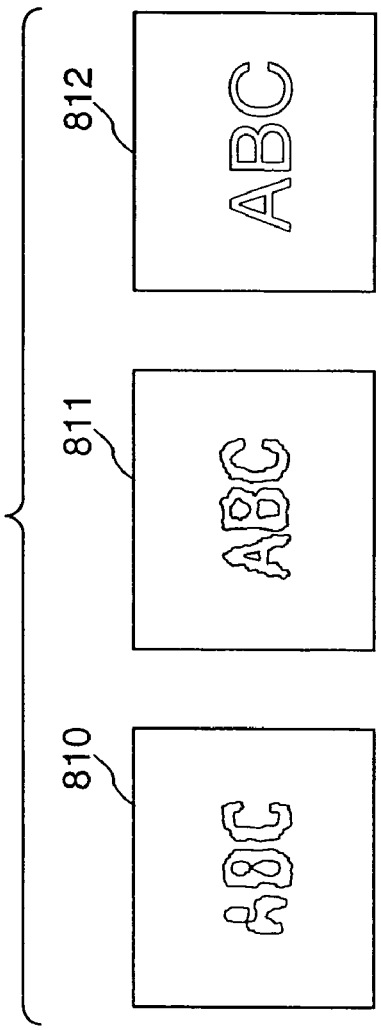

FIG. 9B shows an example of a change in image quality of the image to be displayed, when decoding is done in turn from the most significant bit plane.

In FIG. 9B, after only the most significant bit plane is decoded, the overall feature alone of a source image is displayed, as indicated by an image 810. After a middle bit plane is decoded, a general idea of the source image can be obtained, as indicated by an image 811. After a still lower bit plane is decoded, an image close to the source image is reconstructed, as indicated by an image 812. In this manner, the image quality improves stepwise as decoding progresses from the upper to lower bit planes.

The operation of the correction value computing unit 11 in the decoding process according to the second embodiment in the decoding apparatus shown in FIG. 1B will be explained below. Since the hardware arrangement of the correction value computing unit 11 according to the second embodiment is substantially the same as that shown in FIG. 6 according to the first embodiment, a detailed description thereof will be omitted.

When it is determined that the region of interest is a text image by the method in the first embodiment mentioned above, the correction value computing unit 11 receives the number of a bit plane that has been processed from the entropy decoder 7, selects a correction value r stored in the correction value table 1102 in accordance with the received value, and outputs the selected correction value to the arithmetic unit 802 of the dequantizer 8. Note that the relationship between the bit plane number n and the correction value r to be selected is defined by:

$$r = 0.5; \ n \leq Tp \quad (12)$$

$$r = 0.875; \ n > Tp \quad (13)$$

where Tp is a threshold value determined in advance by a predetermined method. By selecting the correction value r in this way, when the region to be processed is a text image, the coefficient value to be restored by dequantization assumes an intermediate value between coefficient values discretized by quantization as a lower bit plane is decoded.

Figure 10A:
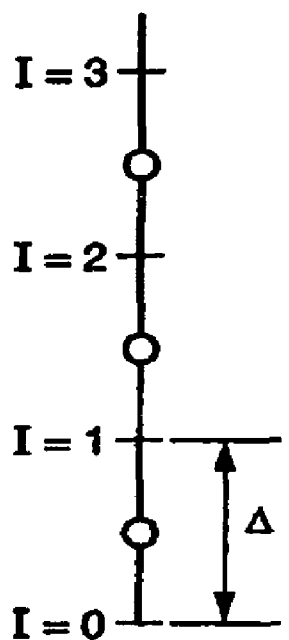
FIGS. 10A and 10B are views for explaining dequantization in the second embodiment of the present invention.
Figure 10B:
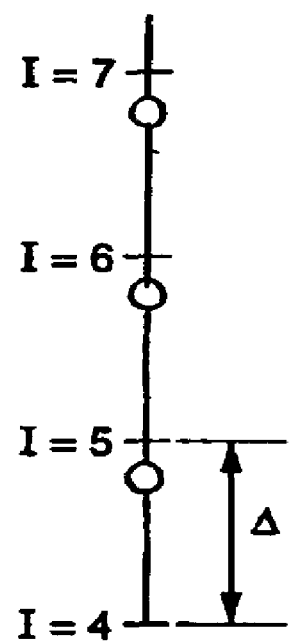

FIGS. 10A and 10B show this state, and the relationship between a dequantized value (indicated by I in FIGS. 10A and 10B) and a restored value (indicated by an open circle in FIGS. 10A and 10B) finally obtained by correction when two different correction values r are selected.

In FIGS. 10A and 10B, upon decoding an upper bit plane, coefficients are restored, as shown in FIG. 10B (r=0.875), and upon decoding a lower bit plane, coefficients are restored, as shown in FIG. 10A (r= 0.5).

Note that decoding of a lower bit plane is equivalent to a smaller quantization step in normal quantization. Hence, upon decoding a lower bit plane, the coefficient value to be restored is set to be an intermediate value between neighboring dequantized values, thus further improving image quality.

Third Embodiment

In the first and second embodiments described above, the correction value r is selected among a plurality of correction values, by referring to neighboring regions of the quantization index to be dequantized in dequantization. Alternatively, the image type may be discriminated at the time of encoding, and the correction value r may be selected upon decoding on the basis of the discrimination result. The third embodiment based on such scheme will be explained below.

Figure 11A:
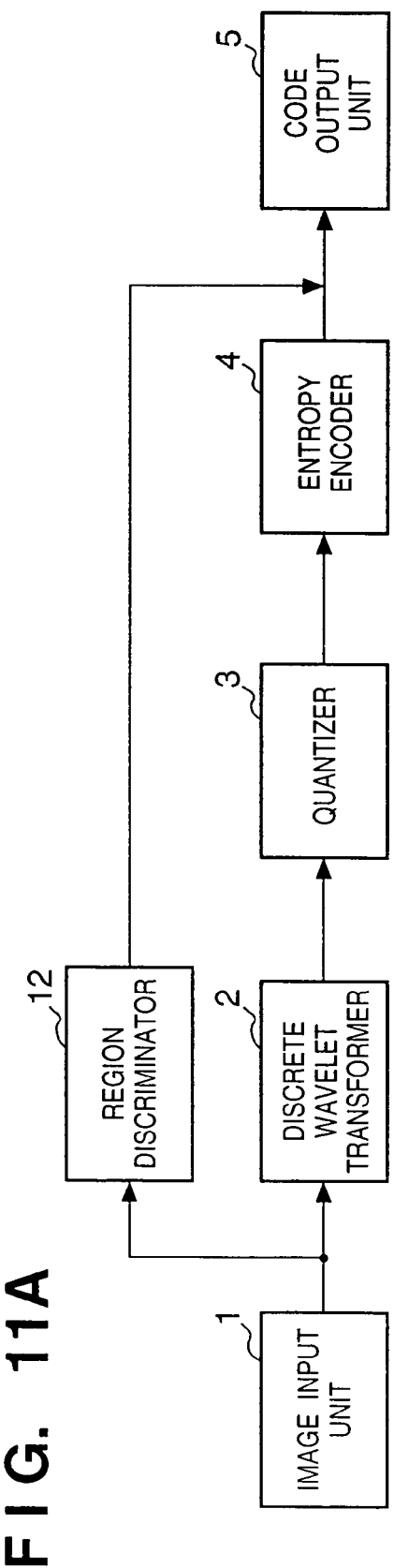
FIG. 11A is a block diagram showing the arrangement of an image encoding apparatus according to the third embodiment of the present invention.
Figure 11B:
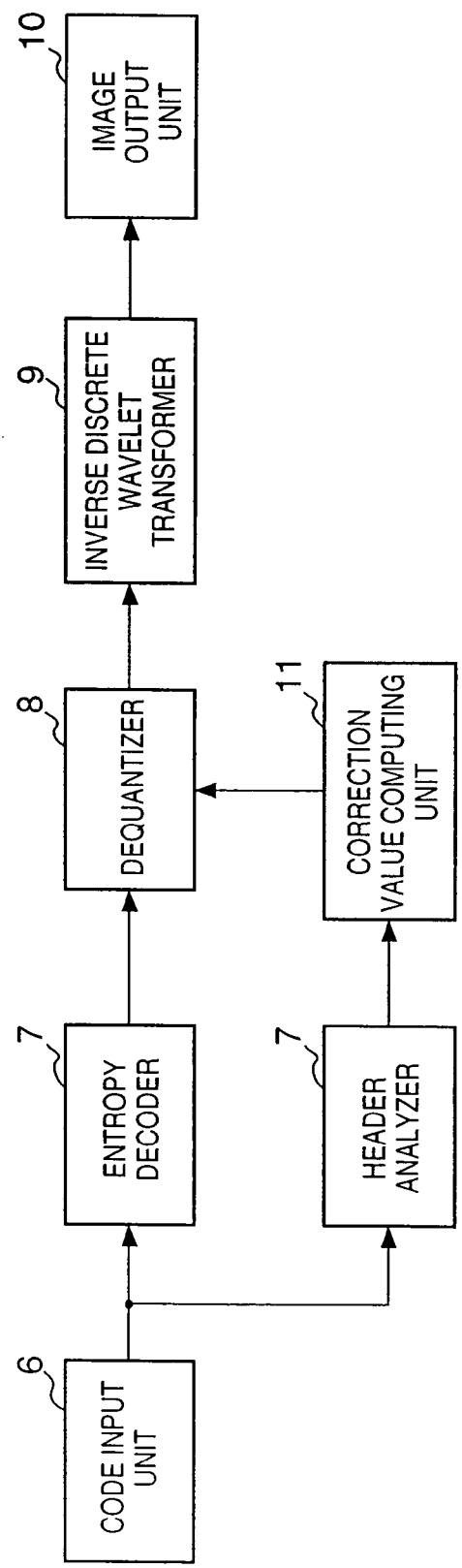
FIG. 11B is a block diagram showing the arrangement of a decoding apparatus according to the third embodiment of the present invention.

FIGS. 11A and 11B are block diagrams showing the arrangements of image encoding and decoding apparatuses according to the third embodiment of the present invention.

FIG. 11A is a block diagram showing the arrangement of an encoding apparatus according to the third embodiment. The basic arrangement is substantially the same as that shown in FIG. 1A, except that the apparatus of the third embodiment comprises a region discriminator 12. That is, the image input unit 1 breaks up an input image into rectangular regions (to be referred to as tiles hereinafter) having a predetermined size, and outputs them in turn to the discrete wavelet transformer 2 and region discriminator 12. In the subsequent processes, since the arrangements and operations of units except for the region discriminator 12 are the same as those in the first embodiment, a description thereof will be omitted.

The region discriminator 12 analyzes the image broken up into tiles in units of tiles, discriminates if the tile is a natural image or text image, and reflects the discrimination result in a parameter in a code sequence output from the entropy encoder 4. Whether an image is a natural image or text image can be determined by a known method of, e.g., checking the distribution of pixel values in each tile. Alternatively, the user may interactively designate a specific portion of an image as a text image.

Note that the discrimination result is included in each tile as one of encoding parameters shown in FIG. 4C, and is output as a code sequence. A process for decoding the code sequence generated in this manner is done as follows.

FIG. 11B is a block diagram showing the arrangement of a decoding apparatus according to the third embodiment of the present invention, which decodes the code sequence generated by the encoding apparatus shown in FIG. 11A.

In FIG. 11B, since the arrangement except for a header analyzer 13 is the same as that in the first embodiment, a description thereof will be omitted. The code input unit 6 reads the encoded code sequence, and outputs codes to the entropy decoder 7 and header analyzer 13 in units of tiles. The header analyzer 13 reads out the region discrimination result in the code sequence input from the code input unit 6, and outputs the readout result to the correction value computing unit 11.

The correction value computing unit 11 checks based on the input from the header analyzer 13 if the image of interest is a natural image or text image. If the image of interest is a natural image, the unit 11 selects the correction value r=0.5 for a natural image and r=0.875 for a text image, among a plurality of correction values, and outputs the selected value to the arithmetic unit of the dequantizer 8.

In this fashion, since a parameter used to obtain the correction value r in dequantization is generated upon encoding and is included in the code sequence, the same effects as in the first and second embodiments can be obtained upon decoding the encoded image.

Another Embodiment

In the first and second embodiments described above, the correction value r is selected based on the surrounding states of the index to be dequantized or the decoded bit plane. Alternatively, the correction value may be selected by combining these methods. Also, the correction value r can be selected based on the value of the quantization index in addition to the aforementioned methods.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As the storage medium for storing such program code, for example, a floppy disk, hard disk, optical disk, magneto-optical disk, CD-ROM, CD-R, magnetic tape, nonvolatile memory card, ROM, and the like may be used.

The program code is included in the scope of the present invention not only when the functions of the embodiments are implemented by controlling various devices by the computer in accordance with the supplied program code alone but also when the embodiments are implemented by the program code in collaboration with the OS (operating system), another application software, or the like. Moreover, the scope of the invention includes a case wherein after the supplied program code is stored in a memory arranged in a function extension board or a function expansion unit connected to the computer, a CPU or the like equipped on that function extension board or function expansion unit executes some or all of actual processing operations in accordance with the instruction of the program code, and the above embodiments are implemented by such processing operations.

Note that the above embodiments have been independently explained. However, the present invention is not limited to this, and the scope of the present invention includes appropriate combinations of the arrangements of the individual embodiments.

As described above, according to this embodiment, in the dequantization process for decoding a code sequence obtained using discrete wavelet transformation, since correction is made by selecting an appropriate correction value in correspondence with the surrounding states of the pixel of interest or the state of the bit plane of interest, even when an image includes image portions having different natures like a natural image and text image, the image can be restored to minimize quantization errors, and the image quality of the finally restored image can be improved.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for receiving and decoding a code sequence obtained by encoding an image, comprising:

decoding means for entropy-decoding the input code sequence to obtain quantization indices;

correction value selection means for selecting a correction value from among a plurality of correction values each having different absolute values from each other, used to correct the quantization indices obtained by said decoding means;

dequantizing means for correcting the quantization indices, by adding or subtracting the correction value selected by said correction value selection means to or from values of the quantization indices and generating a series of coefficient sequences by computing products of the corrected quantization indices and a quantization step; and inverse transforming means for restoring an image signal by executing a predetermined inverse transform manipulation of the coefficient sequences obtained by said dequantizing means.

2. The apparatus according to claim 1, wherein said inverse transforming means executes an inverse discrete wavelet transformation.

3. The apparatus according to claim 1, wherein said correction value selection means selects a constant correction value for dequantization of coefficients which belong to a lowest frequency band of coefficient groups which belong to a plurality of frequency bands and undergo inverse transformation by said inverse transforming means.

4. The apparatus according to claim 1, wherein said correction value selection means selects the correction values on the basis of information that pertains to neighboring regions of a quantization index to be dequantized.

5. The apparatus according to claim 4, wherein the information includes values of quantization indices of the neighboring regions.

6. An image processing apparatus for receiving and decoding a code sequence obtained by encoding an image, comprising:

decoding means for entropy-decoding the input code sequence to obtain quantization indices;

correction value selection means for selecting a correction value from among a plurality of correction values each having different absolute values from each other, used to correct the quantization indices obtained by said decoding means, on the basis of information that pertains to neighboring regions of a quantization index to be dequantized, and on the basis of whether or not the number of zero quantization indices is not less than a predetermined value;

dequantizing means for generating a series of coefficient sequences representing an image by dequantizing the quantization indices which are decoded by said decoding means and are corrected by adding or subtracting the correction value to or from values of the quantization indices; and inverse transforming means for restoring an image signal by executing a predetermined inverse transform manipulation of the coefficient sequences obtained by said dequantizing means.

7. The apparatus according to claim 1, wherein the input code sequence is a code sequence obtained by breaking up coefficients that have undergone discrete wavelet transformation into bit planes, and encoding the bit planes.

8. The apparatus according to claim 7, wherein said correction value selection means selects the correction value in accordance with a value of the bit plane of the code sequence.

9. The apparatus according to claim 1, wherein said correction value selection means selects the correction value in accordance with additional information for specifying the correction value included in the code sequence.

10. An image processing method for receiving and decoding a code sequence obtained by encoding an image, comprising:

a decoding step, of entropy-decoding the input code sequence to obtain quantization indices;

a correction value selection step, of selecting a correction value from among a plurality of correction values each having different absolute values from each other, used to correct the quantization indices obtained in said decoding step;

a dequantization step, of correcting the quantization indices, by adding or subtracting the correction value selected in said correction value selection step to or from values of the quantization indices and generating a series of coefficient sequences by computing products of the corrected quantization indices and a quantization step; and an inverse transforming step, of restoring an image signal by executing a predetermined inverse transform manipulation of the coefficient sequences obtained in said dequantizing step.

11. The method according to claim 10, wherein said inverse transform step includes a step of executing inverse discrete wavelet transformation.

12. The method according to claim 10, wherein said correction value selection step includes the step of selecting a constant correction value for dequantization of coefficients which belong to a lowest frequency band of coefficient groups which belong to a plurality of frequency bands and undergo inverse transformation in said inverse transform step.

13. The method according to claim 10, wherein said correction value selection step includes the step of selecting the correction values on the basis of information that pertains to neighboring regions of a quantization index to be dequantized.

14. The method according to claim 13, wherein the information includes values of quantization indices of the neighboring regions.

15. An image processing method for receiving and decoding a code sequence obtained by encoding an image, comprising:
a decoding step, of entropy-decoding the input code sequence to obtain quantization indices;
a correction value selection step, of selecting a correction value from among a plurality of correction values each having different absolute values from each other, used to correct the quantization indices obtained in said decoding step, on the basis of information that pertains to neighboring regions of a quantization index to be dequantized, and on the basis of whether or not the number of zero quantization indices is not less than a predetermined value;
a dequantization step, of generating a series of coefficient sequences representing an image by dequantizing the quantization indices which are decoded in said decoding step and are corrected by adding or subtracting the correction value to or from values of the quantization indices; and
an inverse transforming step, of restoring an image signal by executing a predetermined inverse transform manipulation of the coefficient sequences obtained in said dequantizing step.

16. The method according to claim 10, wherein the input code sequence is a code sequence obtained by breaking up coefficients that have undergone discrete wavelet transformation into bit planes, and encoding the bit planes.

17. The method according to claim 16, wherein said correction value selection step includes the step of selecting the correction value in accordance with a value of the bit plane of the code sequence.

18. The method according to claim 10, wherein said correction value selection step includes the step of selecting the correction value in accordance with additional information for specifying the correction value included in the code sequence.

19. A computer readable storage medium that stores a program for executing an image processing method for receiving and decoding a code sequence obtained by encoding an image, comprising:
a decoding step module, for entropy-decoding the input code sequence to obtain quantization indices;
a correction value selection step module, for selecting a correction value from among a plurality of correction values each having different absolute values from each other, used to correct the quantization indices obtained by said decoding step module;
a dequantization step module, for correcting the quantization indices, by adding or subtracting the correction value selected in said correction value selection step to or from values of the quantization indices and generating a series of coefficient sequences by computing products of the corrected quantization indices and a quantization step; and
an inverse transforming step module, for restoring an image signal by executing a predetermined inverse transform manipulation of the coefficient sequences obtained in said dequantizing step module.

20. The medium according to claim 19, wherein said inverse transform step module executes inverse discrete wavelet transformation.

21. The medium according to claim 19, wherein said correction value selection step module selects a constant correction value for dequantization of coefficients which belong to a lowest frequency band of coefficient groups which belong to a plurality of frequency bands and undergo inverse transformation in processing by said inverse transform step module.

22. The medium according to claim 19, wherein said correction value selection step module selects the correction values on the basis of information that pertains to neighboring regions of a quantization index to be dequantized.

23. The medium according to claim 22, wherein the information includes values of quantization indices of the neighboring regions.

24. A computer readable storage medium that stores a program for executing an image processing method for receiving and decoding a code sequence obtained by encoding an image, comprising:
a decoding step module, for entropy-decoding the input code sequence to obtain quantization indices;
a correction value selection step module, for selecting a correction value from among a plurality of correction values each having different absolute values from each other, used to correct the quantization indices obtained by said decoding step module, on the basis of information that pertains to neighboring regions of a quantization index to be dequantized, and on the basis of whether or not the number of zero quantization indices is not less than a predetermined value;
a dequantization step module, for generating a series of coefficient sequences representing an image by dequantizing the quantization indices which are decoded by said decoding step module and are corrected by adding or subtracting the correction value to or from values of the quantization indices; and
an inverse transforming step module, for restoring an image signal by executing a predetermined inverse transform manipulation of the coefficient sequences obtained in said dequantizing step module.

25. An image processing apparatus for receiving and decoding a code sequence obtained by encoding an image, comprising:
a decoder, provided to entropy-decode the input code sequence to obtain quantization indices;
a correction value selection unit, provided to select a correction value from among a plurality of correction values each having different absolute values from each other, used to correct the quantization indices obtained by said decoder;
a dequantizer, provided to correct the quantization indices by adding or subtracting the correction value selected by said correction value selection unit to or from values of the quantization indices and generate a series of coefficient sequences by computing products of the corrected quantization indices and a quantization step; and
an inverse transforming unit, provided to restore an image signal by executing a predetermined inverse transform manipulation of the coefficient sequences obtained by said dequantizer.

26. The apparatus according to claim 1, wherein said inverse transforming means executes an inverse transform based on the following equations:

$$c'=\Delta x(q+r); q>0$$

$$c'=\Delta x(q-r); q<0$$

$$C'=0; q=0,$$

where r is a correction value, q is a quantization index, and $\Delta$ is a quantization step.

27. The apparatus according to claim 6, wherein said inverse transforming means executes an inverse transform based on the following equations:

$$c'=\Delta x(q+r); q>0$$

$$c'=\Delta x(q-r); q<0$$

$$C'=0; q=0$$

where r is a correction value, q is a quantization index, and $\Delta$ is a quantization step.

28. The method according to claim 10, wherein said inverse transforming step includes executing an inverse transform based on the following equations:

$$c'=\Delta x(q+r); q>0$$

$$c'=\Delta x(q-r); q<0$$

$$C'=0; q=0$$

where r is a correction value, q is a quantization index, and $\Delta$ is a quantization step.

29. The method according to claim 15, wherein said inverse transforming step includes executing an inverse transform based on the following equations:

$$c'=\Delta x(q+r); q>0$$

$$c'=\Delta x(q-r); q<0$$

$$C'=0; q=0$$

where r is a correction value, q is a quantization index, and $\Delta$ is a quantization step.

* * * * *

UNITED STATES PATENT AND TRADEMARK OFFICE
CERTIFICATE OF CORRECTION

PATENT NO.    : 6,947,600 B1
DATED         : September 20, 2005
INVENTOR(S)   : Makoto Sato et al.

It is certified that error appears in the above-identified patent and that said Letters Patent is hereby corrected as shown below:

<u>Title page, Item [54] and Column 1, line 2,</u>
Title, replace "MEDIUM" with -- MEDIUM, --.

Signed and Sealed this

Twenty-first Day of February, 2006

JON W. DUDAS
*Director of the United States Patent and Trademark Office*